US012526620B2

(12) United States Patent
Goel et al.

(10) Patent No.: US 12,526,620 B2
(45) Date of Patent: Jan. 13, 2026

(54) METHODS, SYSTEMS, AND COMPUTER READABLE MEDIA FOR FACILITATING PROCESSING OF INTER-PUBLIC LAND MOBILE NETWORK (PLMN) MESSAGES RELATING TO EXISTING SUBSCRIPTIONS

(71) Applicant: Oracle International Corporation, Redwood Shores, CA (US)

(72) Inventors: Yesh Goel, Bangalore (IN); Sridhar Karuturi, Raleigh, NC (US); Amarnath Jayaramachar, Bangalore (IN); Doki Satish Kumar Patro, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 864 days.

(21) Appl. No.: 17/746,895

(22) Filed: May 17, 2022

(65) Prior Publication Data
US 2023/0379690 A1 Nov. 23, 2023

(51) Int. Cl.
*H04L 41/02* (2022.01)
*H04L 12/28* (2006.01)
(Continued)

(52) U.S. Cl.
CPC ......... *H04W 8/183* (2013.01); *H04L 12/2876* (2013.01); *H04L 41/024* (2013.01);
(Continued)

(58) Field of Classification Search
CPC ... H04W 4/60; H04W 8/18; H04W 12/00514; H04W 12/72; H04L 67/1021;
(Continued)

(56) References Cited

U.S. PATENT DOCUMENTS 10,939,370 B2   3/2021  Baek et al.
11,470,544 B2  10/2022  Singh et al.
(Continued)

OTHER PUBLICATIONS

ETSI, "TS 123 003 V16.9.0", Mar. 2022, pp. 1-146 (Year: 2022).*
(Continued)

*Primary Examiner* — Salvador E Rivas
(74) *Attorney, Agent, or Firm* — Jenkins, Taylor & Hunt, P.A.

(57) ABSTRACT

A method for facilitating processing of inter-public land mobile network (PLMN) messages relating to existing subscriptions includes receiving, at a first network function (NF) repository function (NRF), an inter-PLMN subscription creation request message for creating a subscription. The method further includes determining, by the first NRF, that the first NRF includes a resource for which the subscription is requested. The method further includes, in response to determining that the first NRF includes a resource for which the subscription is requested, generating, by the first NRF, a subscription creation response message indicating creation of the subscription. The first NRF includes, in the subscription creation response message, a hint indicating that the subscription is located on the first NRF and forwards the first NRF, the subscription creation response message towards a consumer NF.

9 Claims, 10 Drawing Sheets

(51) Int. Cl.

| | |
|---|---|
| *H04L 41/04* | (2022.01) |
| *H04W 4/60* | (2018.01) |
| *H04W 8/18* | (2009.01) |
| *H04W 8/20* | (2009.01) |
| *H04B 7/08* | (2006.01) |
| *H04L 67/1021* | (2022.01) |
| *H04W 12/72* | (2021.01) |
| *H04W 84/04* | (2009.01) |

(52) U.S. Cl.
CPC ............. *H04L 41/04* (2013.01); *H04W 4/60* (2018.02); *H04W 8/18* (2013.01); *H04W 8/20* (2013.01); *H04B 7/0834* (2013.01); *H04L 67/1021* (2013.01); *H04W 12/72* (2021.01); *H04W 84/042* (2013.01)

(58) Field of Classification Search
CPC ............. H04L 41/045; H04L 12/2876; H04L 12/2407; H04L 12/243; H04L 12/242; H04L 12/2425; H04L 12/2455; H04L 12/2459; H04L 29/0621; H04L 41/04; H04L 41/024; H04B 7/0834
See application file for complete search history.

(56) References Cited

U.S. PATENT DOCUMENTS

| | | | |
|---|---|---|---|
| 11,849,506 | B2 | 12/2023 | Jayaramachar et al. |
| 11,917,720 | B2 | 2/2024 | Goel et al. |
| 11,950,178 | B2 | 4/2024 | Singh et al. |
| 2014/0349694 | A1 | 11/2014 | Raghothaman et al. |
| 2021/0297935 | A1 | 9/2021 | Belling et al. |
| 2021/0385286 | A1* | 12/2021 | Wang ................. H04L 67/51 |
| 2021/0392197 | A1 | 12/2021 | Yang et al. |
| 2022/0015023 | A1 | 1/2022 | De-Gregorio-Rodriguez et al. |
| 2022/0240171 | A1 | 7/2022 | Singh |
| 2023/0007536 | A1* | 1/2023 | Sharma ............... H04W 28/088 |
| 2023/0042219 | A1 | 2/2023 | Singh et al. |
| 2023/0099468 | A1 | 3/2023 | Khare et al. |
| 2023/0110726 | A1* | 4/2023 | He ........................ H04L 43/20 370/254 |
| 2023/0188972 | A1 | 6/2023 | Goel et al. |
| 2023/0239680 | A1* | 7/2023 | Park ..................... H04L 41/14 370/329 |

OTHER PUBLICATIONS

ETSI, "TS 123 527 V17.3.1", May 2022, pp. 1-39 (Year: 2022).*
ETSI, "TS 129 510 V15.3.0", Apr. 2019, pp. 1-121 (Year: 2019).*
Notice of Allowance for U.S. Appl. No. 17/551,124, (filed Oct. 12, 2023).
Notice of Allowance for U.S. Appl. No. 17/392,288, (filed Jul. 27, 2023).
Notice of Allowance for U.S. Appl. No. 17/497,879, (filed Jul. 26, 2023).
Non-Final Office Action for U.S. Appl. No. 17/392,288, (filed Apr. 5, 2023).
"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).
"3rd Generation Partnership Project; Technical Specification Group Core Network and Terminals; Numbering, addressing and identification; (Release 17)," 3GPP TS 23.003, V17.3.0, pp. 1-145 (Sep. 2021).
Notice of Allowance for U.S. Appl. No. 17/156,149, (filed May 24, 2022).
Notice of Allowance for U.S. Appl. No. 17/156,149, (filed Apr. 19, 2022).
Commonly-Assigned, co-pending U.S. Appl. No. 17/551,124 for "Methods, Systems, and Computer Readable Media for Enabling Forwarding of Subsequent Network Function Subscription Updates," (Unpublished, filed Dec. 14, 2021).
Commonly-Assigned, co-pending U.S. Appl. No. 17/497,879 for "Methods, Systems, and Computer Readable Media for Routing Inter-Public Land Mobile Network (Inter-PLMN) Messages Related to Existing Subscriptions with Network Function (NF) Repository Function (NRF) Using Security Edge Protection Proxy (SEPP)," (Unpublished, filed Oct. 8, 2021).
Commonly-Assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications via Service Communications Proxy (SCP)," (Unpublished, filed Aug. 3, 2021).
"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).
"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Notice of Allowance for U.S. Appl. No. 17/392,288, (filed Nov. 17, 2023).

\* cited by examiner

METHODS, SYSTEMS, AND COMPUTER READABLE MEDIA FOR FACILITATING PROCESSING OF INTER-PUBLIC LAND MOBILE NETWORK (PLMN) MESSAGES RELATING TO EXISTING SUBSCRIPTIONS

TECHNICAL FIELD

The subject matter described herein relates to processing messages relating to existing subscriptions. More particularly, the subject matter described herein relates to methods, systems, and computer readable media for facilitating processing of inter-PLMN messages relating to existing subscriptions.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other types of networks is that existing mechanisms for processing inter-PLMN messages relating to existing subscriptions may fail when a subscriber is roaming in a visited PLMN and a consumer NF in the visited PLMN needs to subscribe to receive notifications from an NRF regarding a producer NF in the subscriber's home PLMN. The consumer NF in the visited PLMN generates and sends a subscription creation request message. The subscription creation request message is routed from the visited PLMN to the home PLMN. The SEPP in the home PLMN may forward the message to an NRF in the home PLMN. If the NRF on which the subscription creation request lands contains the requested data for the subscription, i.e., if the target producer NF is registered with the NRF, the NRF may create the subscription and respond to the subscription creation request. However, if the NRF on which the subscription creation request lands does not have the requested subscription data, the NRF may forward the message to another NRF. If that NRF has the requested subscription data, the NRF will respond to the consumer NF by transmitting a subscription creation response message to the consumer NF in the visited PLMN. However, the subscription creation response message does not include information as to the identity or location of the NRF on which the subscription was created.

When consumer NF in the visited PLMN needs to update or delete the subscription, consumer NF sends a message for updating or deleting the subscription to the home PLMN. The SEPP in the home PLMN may forward the subscription or delete request message to an NRF on which the subscription does not reside. That NRF may discard the message or forward the message to another NRF on which the subscription does not reside. As a result, processing of the subsequent message relating to the subscription may fail or at least be delayed.

Accordingly, in light of these difficulties, there exists a need for methods, systems, and computer readable media for facilitating processing of inter-PLMN messages relating to existing subscriptions.

SUMMARY

A method for facilitating processing of inter-public land mobile network (PLMN) messages relating to existing subscriptions includes receiving, at a first network function (NF) repository function (NRF), an inter-PLMN subscription creation request message for creating a subscription. The method further includes determining, by the first NRF, that the first NRF includes a resource for which the subscription is requested. The method further includes, in response to determining that the first NRF includes a resource for which the subscription is requested, generating, by the first NRF, a subscription creation response message indicating creation of the subscription. The first NRF includes, in the subscription creation response message, a hint indicating that the subscription is located on the first NRF and forwards the first NRF, the subscription creation response message towards a consumer NF.

According to another aspect of the subject matter described herein, receiving the inter-PLMN subscription creation request message includes receiving a subscription creation request message forwarded by a second NRF that does not host the resource for which the subscription is requested.

According to another aspect of the subject matter described herein, the method for facilitating processing of inter-PLMN messages associated with a subscription includes receiving, at the second NRF, a message relating to the subscription and including the hint indicating that the subscription is located on the first NRF, using the hint to determine that the subscription is located on the first NRF; and forwarding the message relating to the subscription to the first NRF.

According to another aspect of the subject matter described herein, receiving the message relating to the subscription includes receiving a message for updating or deleting the subscription.

According to another aspect of the subject matter described herein, receiving the inter-PLMN subscription creation request message includes receiving the inter-PLMN subscription creation request message from a security edge protection proxy (SEPP).

According to another aspect of the subject matter described herein, determining whether the first NRF includes the resource for which the subscription is requested includes determining whether a producer NF identified by the inter-PLMN subscription creation request message is registered with the first NRF.

According to another aspect of the subject matter described herein, including, by the first NRF, the hint in the subscription creation response message comprises including the hint as at least a portion of a subscription identifier in the subscription creation response message.

According to another aspect of the subject matter described herein, the method for facilitating processing of inter-PLMN messages relating to existing subscriptions includes, at the consumer NF, receiving the subscription creation response message, storing the subscription identifier, including the hint, and using the subscription identifier in subsequent messages relating to the subscription.

According to another aspect of the subject matter described herein, including the hint in the subscription creation response message comprises adding a hint identifying a region of the first NRF to the subscription creation response message.

According to another aspect of the subject matter described herein, including the hint in the subscription creation response message comprises adding a hint identifying an NF instance identifier of the first NRF to the subscription creation response message.

According to another aspect of the subject matter described herein, a system for facilitating processing of inter-public land mobile network (PLMN) messages relating to existing subscriptions is provided. The system includes a first network function (NF) repository function (NRF) including at least one processor for receiving an inter-PLMN subscription creation request message for creating a subscription and determining, by the first NRF, that the first NRF includes a resource for which the subscription is requested. The system further includes a hint generator/handler implemented by the at least one processor for, in response to determining that the first NRF includes a resource for which the subscription is requested, generating, by the first NRF, a subscription creation response message indicating creation of the subscription, including, by the first NRF and in the subscription creation response message, a hint indicating that the subscription is located on the first NRF, and forwarding, by the first NRF, the subscription creation response message towards a consumer NF.

According to another aspect of the subject matter described herein, the system for facilitating processing of inter-PLMN messages relating to existing subscriptions includes a second NRF, and the inter-PLMN subscription creation request message includes a subscription creation request message forwarded by the second NRF, which does not host the resource for which the subscription is requested.

According to another aspect of the subject matter described herein, the second NRF is configured to receive a message relating to the subscription and including the hint indicating that the subscription is located on the first NRF, use the hint to determine that the subscription is located on the first NRF; and forward the message relating to the subscription to the first NRF.

According to another aspect of the subject matter described herein, the message relating to the subscription includes a message for updating or deleting the subscription.

According to another aspect of the subject matter described herein, the first NRF is configured to receive the inter-PLMN subscription creation request message from a security edge protection proxy (SEPP).

According to another aspect of the subject matter described herein, in determining whether the first NRF includes the resource for which the subscription is requested, the first NRF is configured to determine whether a producer NF identified by the inter-PLMN subscription creation request message is registered with the first NRF.

According to another aspect of the subject matter described herein, the first NRF is configured to include the hint as at least a portion of a subscription identifier in the subscription creation response message.

According to another aspect of the subject matter described herein, the hint identifies a region of the first NRF.

According to another aspect of the subject matter described herein, the hint comprises an NF instance identifier of the first NRF.

According to another aspect of the subject matter described herein, a non-transitory computer readable medium having stored thereon executable instructions that when executed by the processor of a computer control the computer to perform steps is provided. The steps include receiving, at a first network function (NF) repository function (NRF), an inter-public land mobile network (PLMN) subscription creation request message for creating a subscription. The steps further include determining, by the first NRF, that the first NRF includes a resource for which the subscription is requested. The steps further include, in response to determining that the first NRF includes a resource for which the subscription is requested, generating, by the first NRF, a subscription creation response message indicating creation of the subscription. The steps further comprise including, by the first NRF and in the subscription creation response message, a hint indicating that the subscription is located on the first NRF. The steps further include forwarding, by the first NRF, the subscription creation response message towards a consumer NF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
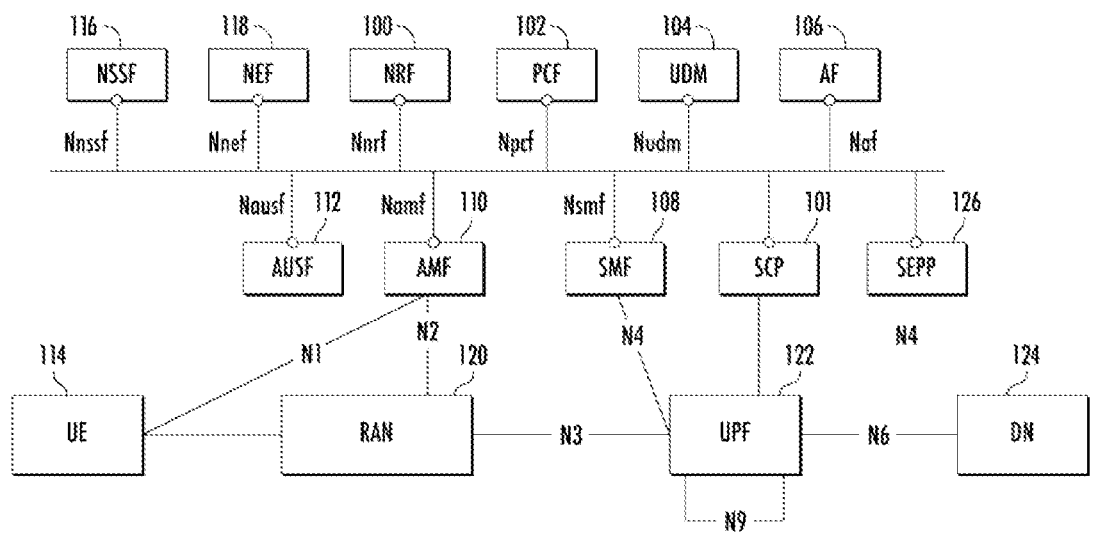
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a user defined unified data management (UDM) 104 that manages user data, and an application function (AF) 106 that provides application services.

The NFs illustrated in FIG. 1 further include an SMF 108 that manages sessions between AMF 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
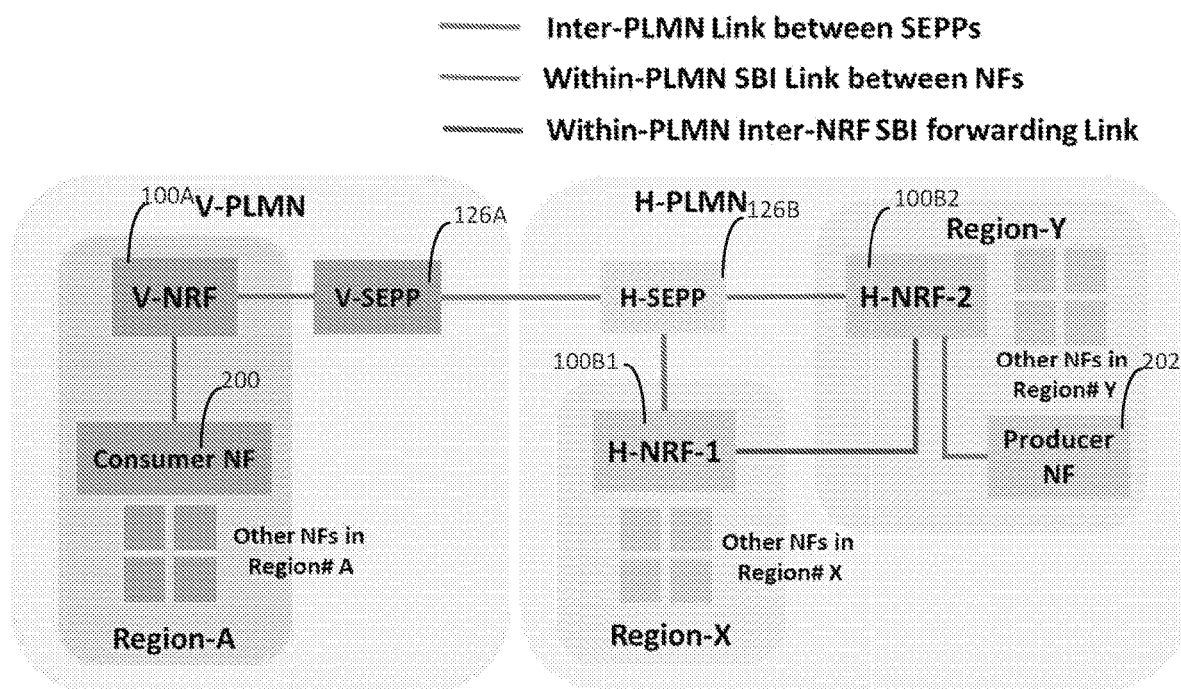
FIG. 2 is a network diagram illustrating a network with an inter-PLMN NRF roaming interconnection.

As stated above, one problem that can occur in 5G and other types of networks is that processing of inter-PLMN messages relating to existing subscriptions can fail or be delayed because of the failure to communicate information regarding the location or identity of the NRF on which a subscription is created. FIG. 2 is a network diagram illustrating PLMNs that have an inter-PLMN NRF roaming interconnection. Referring to FIG. 2, a consumer NF 200 located in a visited PLMN of a subscriber may seek to subscribe with an NRF in the home PLMN to receive notification of events corresponding to a producer NF 202 located in the home PLMN. Producer NF 202 is registered with NRF1 100B1. The home PLMN may be divided into multiple regions, which in the illustrated example include region X and region Y. Home NRF1 100B1 is located in region X and home NRF2 100B2 is located in region Y.

In the example illustrated in FIG. 2, it is assumed that home NRF1 100B1 and home NRF2 100B2 have a forwarding relationship, meaning that if a subscription creation request lands on one of NRFs 100B1 and 100B2 with which a producer NF is not registered, the receiving NRF may forward the subscription creation request to the other NRF. Such a forwarding relationship may extend beyond two NRFs in the home network. The visited PLMN may also have multiple regions, although only a single region is shown in FIG. 2. Visited NRF 100A and home NRFs 100B1 and 100B2 are connected via visited SEPP 126A and home SEPP 126B.

Figure 3:
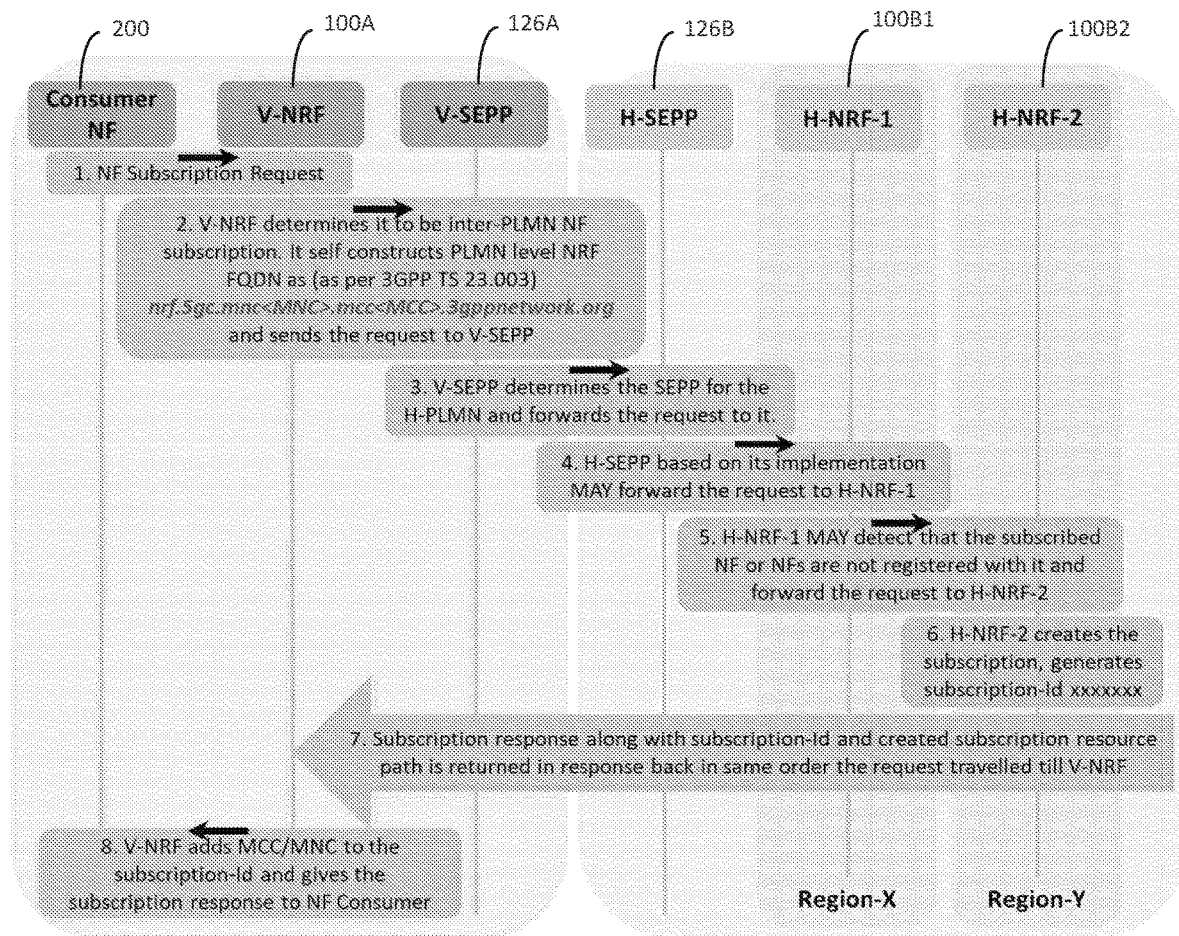
FIG. 3 is a message flow diagram illustrating exemplary messages exchanged for inter-PLMN subscription creation.

FIG. 3 is a message flow diagram illustrating exemplary messages associated with inter-PLMN subscription creation. Referring to FIG. 3, in step 1, consumer NF 200 located in the visited PLMN generates and sends a subscription creation request to visited NRF 100A. In step 2, visited NRF 100A identifies the subscription creation request to be a request for an inter-PLMN NF subscription. Visited NRF 100A self-constructs a PLMN-level NRF fully qualified domain name (FQDN) as specified by 3GPP TS 23.003. In this example, the PLMN-level FQDN is:

nrf.5gc.mnc<MNC>.mcc<MCC>0.3gppnetwork.org.

The PLMN-level FQDN is a generic FQDN and does not identify a specific target NRF in the home network.

Visited SEPP 126A receives the inter-PLMN subscription creation request, identifies the SEPP corresponding to the target PLMN, and, in step 3, forwards the inter-PLMN subscription creation request to home SEPP 126B. When the inter-PLMN NF subscription creation request reaches home SEPP 126B, home SEPP 126B needs to resolve the PLMN-level NRF FQDN—either through the Domain Name System (DNS) or through a static routing table. The producer NF for the requested subscription may be registered with home NRF2 100B2 located in region Y. However, home SEPP 126B may forward the subscription creation request based on local configuration to home NRF1 100B1 located in region X, as indicated by step 4.

Home NRF1 100B1 receives the subscription creation request and determines that the producer NF that is the target of the requested subscription is not registered with home NRF1 100B1. Accordingly, in step 5, home NRF 100B1 forwards the subscription creation request to home NRF2 100B2.

Home NRF2 100B2 receives the subscription creation request and, in this example, determines that it is the NRF on which the NF profile for the target producer NF resides. In step 6, home NRF2 100B2 creates a subscription and generates a subscription ID, which does not identify home NRF2 100B2 or its location. In step 7, home NRF2 100B2 sends a subscription creation response message including the subscription ID and the created subscription resource path to visited NRF 100A. Visited NRF 100A receives the subscription creation response, adds the mobile country code and mobile network code to the subscription response, and, in step 8, forwards the subscription creation response to consumer NF 200. It should be noted that the subscription creation response message does not include an identifier or an indication of the location of NRF2 100B2 on which the subscription was created.

Figure 4:
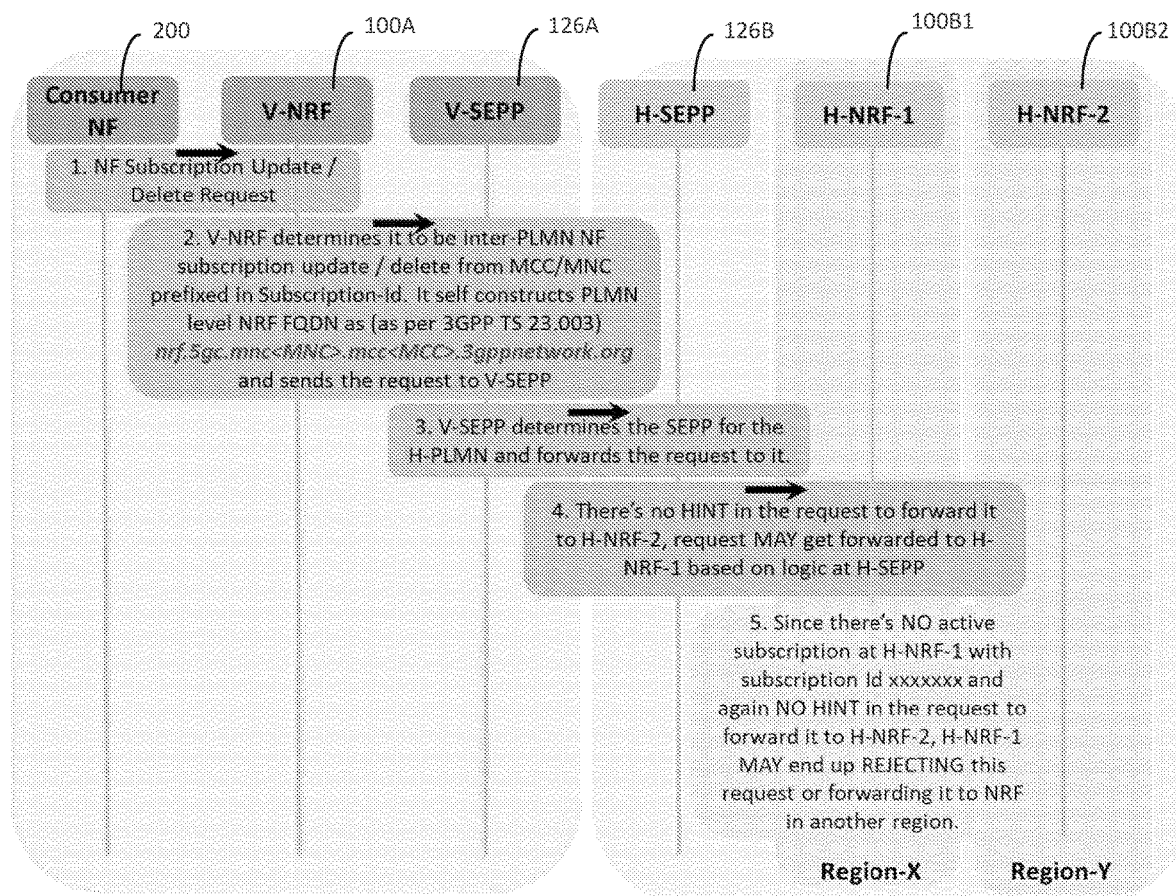
FIG. 4 is a message flow diagram illustrating routing of inter-PLMN messages relating to existing subscriptions.

FIG. 4 is a message flow diagram illustrating challenges associated with routing subsequent messages associated with a subscription created in the manner illustrated in FIG. 3. Referring to FIG. 4, in step 1, consumer NF 200 generates and sends a message to update or delete the subscription created using the steps in FIG. 3. The message may be an NF subscription update or delete request. An example of an NF subscription update request is an HTTP PATCH message that includes new parameters for triggering notifications according to the subscription. An example of an NF subscription delete request is an NFStatusUnsubscribe message, which unsubscribes the sender from receiving notifications according to an existing subscription, effectively deleting the subscription. The subscription update or delete request includes the subscription identifier, but does not include information identifying the NRF on which the subscription was created or its location.

In step 2, visited NRF 100A determines, using the MCC/MNC prefix to the subscription identifier, that the subscription update or delete request is an inter-PLMN subscription update or delete request. Accordingly, visited NRF 100 self-constructs the PLMN-level FQDN, as described above with respect to FIG. 3. Visited NRF 100A forwards the inter-PLMN NF subscription update or delete message to visited SEPP 126A.

Visited SEPP 126A receives the inter-PLMN NF subscription update or delete message and identifies home SEPP 126B as the SEPP for the target PLMN. In step 3, visited SEPP 126A forwards the inter-PLMN NF subscription update or delete message to home SEPP 126B. It should be noted that the message does not include a hint or other parameter that identifies the NRF on which the target subscription resides. Accordingly, home SEPP 126B may forward the request to home NRF1 100B1 or another NRF on which the subscription does not reside.

In step 5, home NRF1 100B1 receives the message relating to the existing subscription. However, home NRF1 100B1 does not have a subscription corresponding to the subscription identifier, and there is no hint or other indication in the message as to the location or identity of the NRF that created the subscription. Accordingly, home NRF1 100B1 may reject the subscription update message, treat the subscription as expired, or forward the subscription update request to an NRF in another region, which may or may not be the correct NRF on which the subscription resides. Rejecting or forwarding the subscription update request to another NRF on which the subscription does not reside is undesirable and can result in delayed processing of messages relating to existing subscriptions.

In order to reduce the likelihood of the scenario described with regard to FIGS. 3 and 4, the subject matter described herein includes having the NRF on which a subscription is created add a hint to the subscription creation response message that identifies the location or identity of the NRF on which the subscription was created. In one example, the hint is a region identifier, which identifies a geographic region of the NRF on which the subscription is created. In another example, the hint may be an NF instance identifier of the NRF on which the subscription was created. The hint may be included as part of the subscription identifier. The subscription identifier is communicated back to the consumer NF (or SCP) that requested the subscription. When the consumer NF generates a message relating to the existing subscription, such as a subscription update or delete message, the consumer NF will include the subscription identifier in the message. This is standard consumer NF behavior and thus does not require modification of the consumer NF or any of the intermediate nodes between the consumer NF and PLMN where the target NRF resides. When the message arrives in the PLMN where the target NRF resides, the NRF on which the message relating to the existing subscription lands may not be the target NRF. However, if the NRF is not the target NRF, the NRF uses the hint to identify the NRF on which the subscription resides and forwards the message to the target NRF.

Figure 5:
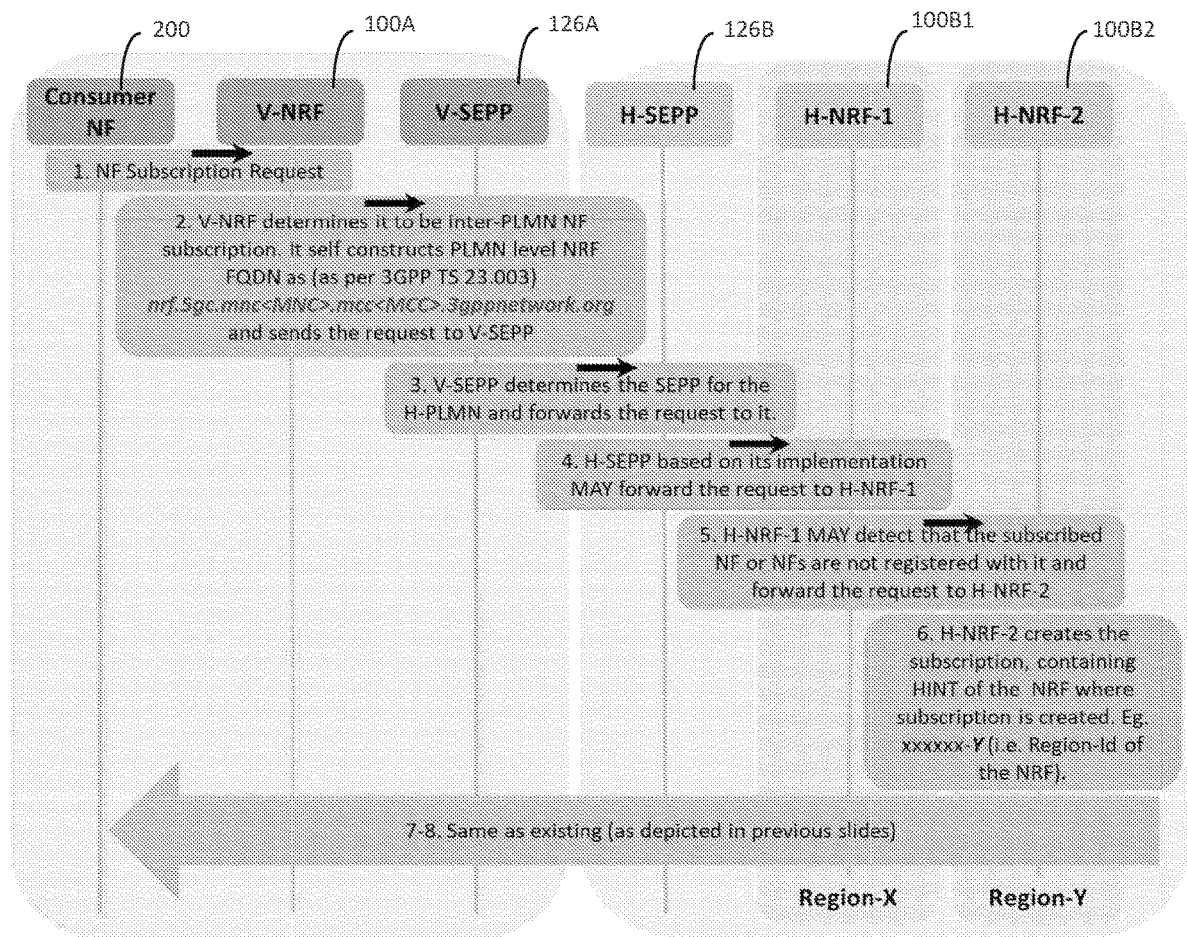
FIG. 5 is a message flow diagram illustrating exemplary messages exchanged associated with inter-PLMN subscription creation and the insertion of a hint in a subscription creation response to identify or locate the NRF on which a subscription resides.

FIG. 5 is a message flow diagram illustrating exemplary messages exchanged for inter-PLMN NF subscription creation where the NRF that creates the subscription includes a hint of the identity and/or region of the NRF in the subscription identifier that is returned to the consumer NF in the subscription creation response message. Referring to FIG. 5, in step 1, consumer NF 200 located in the visited PLMN generates and sends an NF subscription creation request to visited NRF 100A. In step 2, visited NRF 100A identifies the subscription creation request to be a request for an inter-PLMN NF subscription. Visited NRF 100A self-constructs a PLMN-level NRF FQDN as specified by 3GPP TS 23.003. As indicated above, the PLMN-level FQDN is a generic FQDN and does not identify a specific target NRF in the home network.

Visited SEPP 126A receives the inter-PLMN subscription creation request, identifies the SEPP corresponding to the target PLMN, and, in step 3, forwards the inter-PLMN subscription creation request to home SEPP 126B. When the inter-PLMN NF subscription creation request reaches home SEPP 126B, home SEPP 126B needs to resolve the PLMN-level NRF FQDN—either through DNS or using a static routing table. The producer NF for the requested subscription may be registered with home NRF2 100B2 located in region Y. However, home SEPP 126B may forward the subscription creation request based on local configuration to home NRF1 100B1 located in region X, as indicated by step 4.

Home NRF1 100B1 receives the subscription creation request and determines that the producer NF that is the target of the requested subscription is not registered with home NRF1 100B1. Accordingly, in step 5, home NRF 100B1 forwards the subscription creation request to home NRF2 100B2.

Home NRF2 100B2 receives the subscription creation request and, in this example, determines that it is the NRF on which the NF profile for the target producer NF resides. In step 6, home NRF2 100B2 creates a subscription and generates a subscription identifier, which contains a hint as to the NRF that created the subscription. In this example, the hint may be or include the region identifier of home NRF2 100B2. In step 7, home NRF2 100B2 sends a subscription creation response message including the subscription identifier and the created subscription resource path to visited NRF 100A. Visited NRF 100A receives the subscription creation response, adds the mobile country code and mobile network code to the subscription creation response, and, in step 8, forwards the subscription creation response to consumer NF 200. Consumer NF 200 stores the subscription identifier, including the hint, as part of its normal subscription processing behavior.

Figure 6:
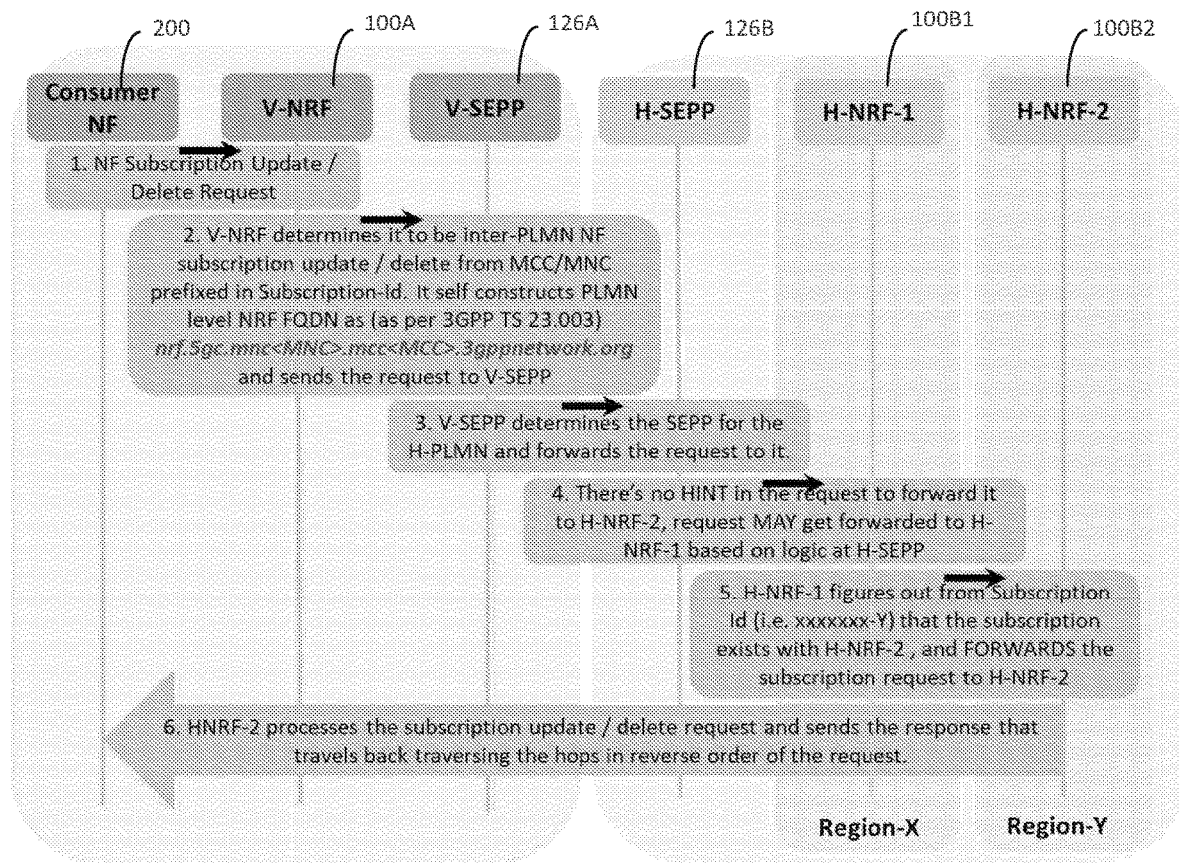
FIG. 6 is a message flow diagram illustrating exemplary messages exchanged associated with routing a message relating to an existing subscription using the hint provided in the subscription creation response message.

FIG. 6 is a message flow diagram illustrating improved handling of subscription update or delete messages using the hint generated in FIG. 5. Referring to FIG. 6, in step 1, consumer NF 200 generates and sends a message to update or delete the subscription created using the steps in FIG. 5. The message may be an NF subscription update or delete request. The subscription update or delete request includes the subscription identifier, which includes the hint that indicates the identity and/or region of the NRF that created the subscription.

In step 2, visited NRF 100A determines, using the MCC/MNC prefix to the subscription identifier, that the subscription update or delete request is an inter-PLMN subscription update or delete request. Accordingly, visited NRF 100 self-constructs the PLMN-level FQDN as per 3GPP TS 23.003. Visited NRF 100A forwards the inter-PLMN NF subscription update or delete message to visited SEPP 126A.

Visited SEPP 126A receives the inter-PLMN NF subscription update or delete message and identifies home SEPP 126B as the SEPP for the target PLMN. In step 3, visited SEPP 126A forwards the inter-PLMN NF subscription update or delete message to home SEPP 126B. Home SEPP 126B may forward the subscription update or delete request message to home NRF1 100B1 or another NRF on which the subscription does not reside, as indicated by step 4. However, the receiving NRF, which in this case is home NRF1 100B1, reads the subscription identifier, determines that the subscription does not reside on home NRF 100B1, and uses the hint to identify home NRF2 100B2 as the target of the subscription update or delete request. In step 5, home NRF1 100B1 routes the subscription update or delete request to home NRF2 100B2, which is the NRF that created the subscription. In step 6, home NRF2 100B2 processes the subscription update or delete request and sends a response message to consumer NF 200.

Figure 7:
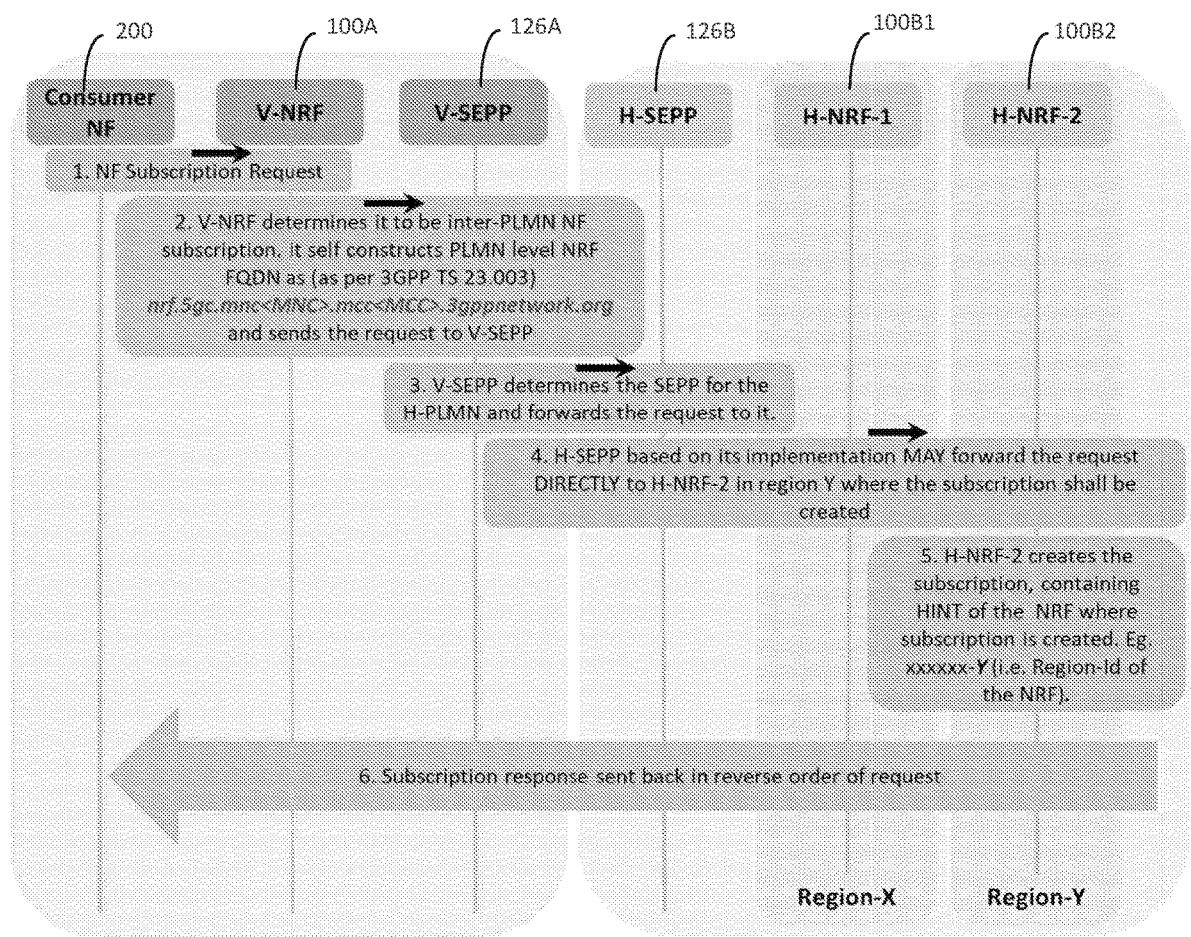
FIG. 7 is a message flow diagram illustrating exemplary messages exchanged for subscription creation when NRF forwarding does not occur in the home PLMN when the subscription is created.

FIG. 7 is a message flow diagram illustrating exemplary messages exchanged for inter-PLMN subscription creation where the home SEPP forwards the subscription creation request directly to the NRF where the producer NF is registered. Referring to FIG. 7, in step 1, consumer NF 200 located in the visited PLMN generates and sends an NF subscription creation request to visited NRF 100A. In step 2, visited NRF 100A identifies the subscription creation request to be a request for an inter-PLMN NF subscription. Visited NRF 100A self-constructs a PLMN-level NRF FQDN as specified by 3GPP TS 23.003. As indicated above, the PLMN-level FQDN is a generic FQDN and does not identify a specific target NRF in the home network.

Visited SEPP 126A receives the inter-PLMN subscription creation request, identifies the SEPP corresponding to the target PLMN, and, in step 3, forwards the inter-PLMN subscription creation request to home SEPP 126B. When the inter-PLMN NF subscription creation request reaches home SEPP 126B, home SEPP 126B forwards the subscription creation request based on local configuration to home NRF2 100B2 located in region Y, as indicated by step 4.

Home NRF2 100B2 receives the subscription creation request and, in this example, determines that it is the NRF on which the NF profile for the target producer NF resides. In step 5, home NRF2 100B2 creates a subscription and generates a subscription identifier, which contains a hint as to the NRF that created the subscription. In this example, the hint may be or include the region identifier of home NRF2 100B2. In step 6, home NRF2 100B2 sends a subscription creation response message including the subscription identifier (with the hint) and the created subscription resource path to visited NRF 100A. Visited NRF 100A receives the subscription creation response, adds the mobile country code and mobile network code to the subscription creation response, and forwards the subscription creation response to consumer NF 200. Consumer NF 200 stores the subscription identifier, including the hint, as part of its normal subscription processing behavior.

Figure 8:
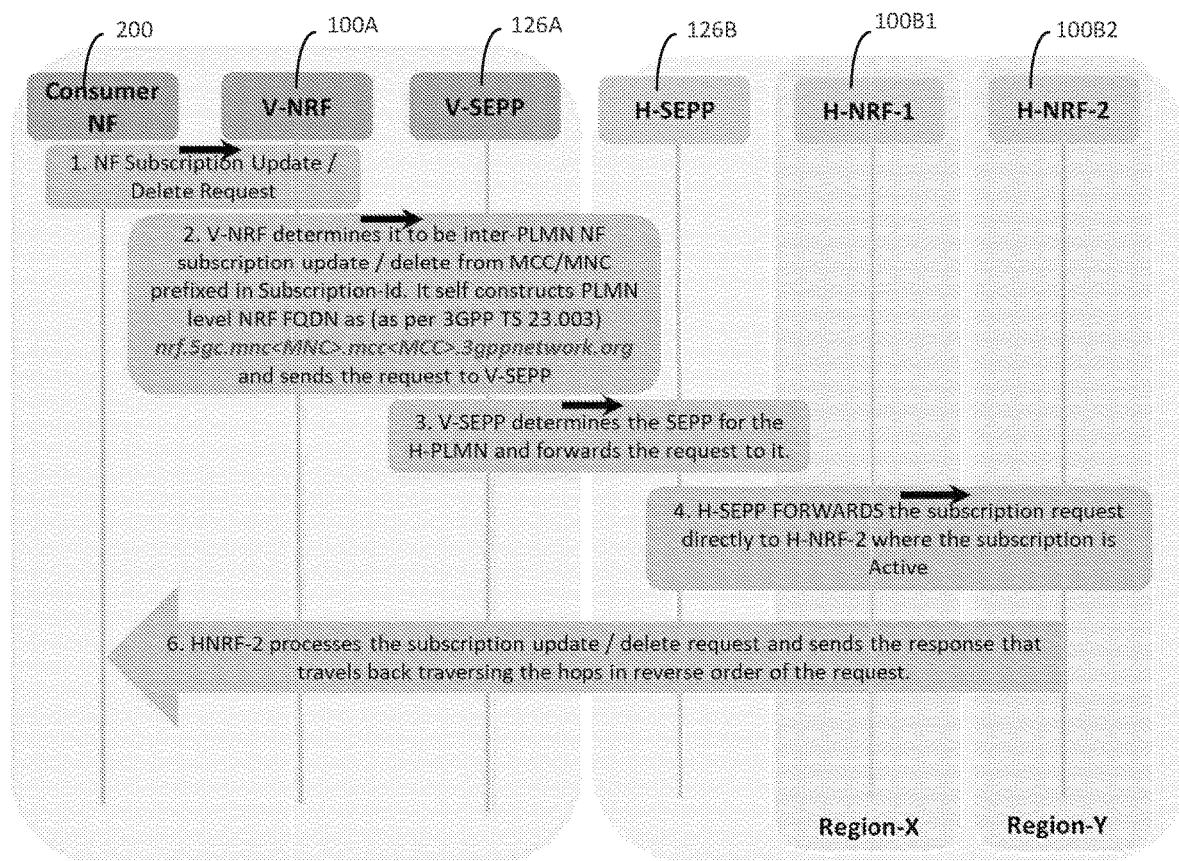
FIG. 8 is a message flow diagram illustrating exemplary routing of messages associated with an existing subscription when NRF forwarding does not occur in the home PLMN.

FIG. 8 is a message flow diagram illustrating exemplary messages exchanged for a subscription update or delete transaction where the subscription update or delete message lands on the NRF where the subscription was created (and no forwarding is required). Referring to FIG. 8, in step 1, consumer NF 200 generates and sends a message to update or delete the subscription created using the steps in FIG. 7. The message may be an NF subscription update or delete request. The subscription update or delete request includes the subscription identifier, which includes the hint that identifies the NRF that created the subscription.

In step 2, visited NRF 100A determines, using the MCC/MNC prefix to the subscription identifier, that the subscription update or delete request is an inter-PLMN subscription update or delete request. Accordingly, visited NRF 100 self-constructs the PLMN-level FQDN as per 3GPP TS 23.003. Visited NRF 100A forwards the inter-PLMN NF subscription update or delete message to visited SEPP 126A.

Visited SEPP 126A receives the inter-PLMN NF subscription update or delete message and identifies home SEPP 126B as the SEPP for the target PLMN. In step 3, visited SEPP 126A forwards the inter-PLMN NF subscription update or delete message to home SEPP 126B. Home SEPP 126B may, based on its routing rules (without using the hint), forward the request to home NRF2 100B2 where the subscription resides. In step 6, home NRFB2 100B2 processes the subscription update or delete request and sends a response message to consumer NF 200.

Figure 9:
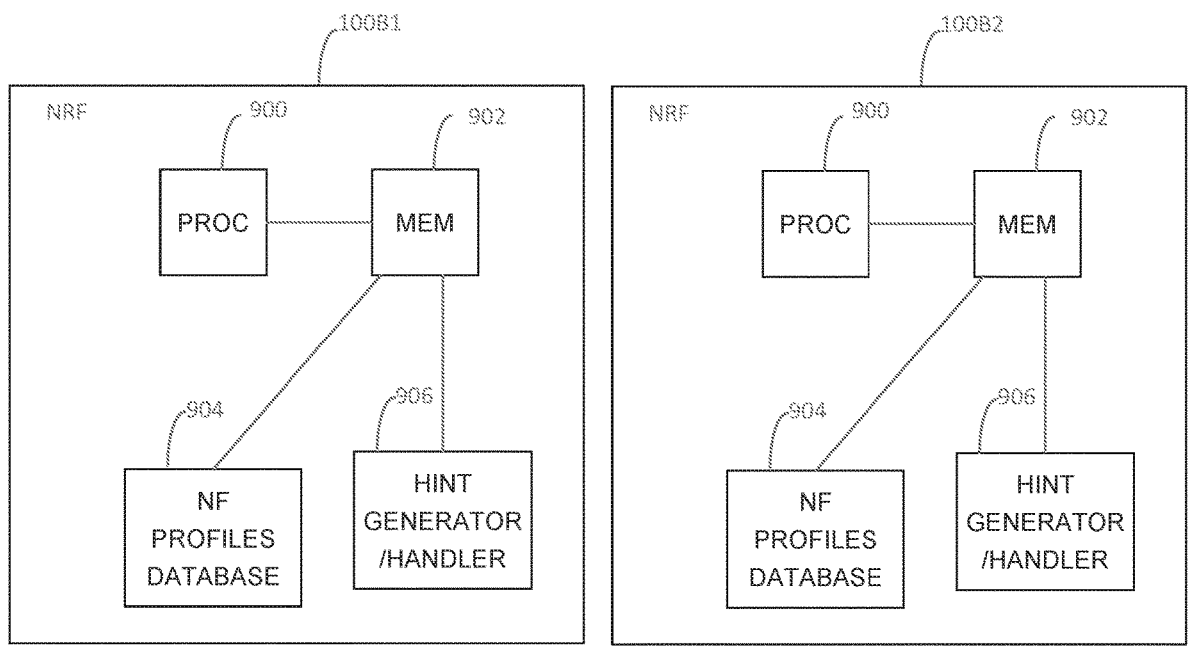
FIG. 9 is a block diagram illustrating an exemplary architecture of a system for facilitating processing of inter-PLMN messages relating to an existing subscription.

FIG. 9 is a block diagram illustrating an exemplary architecture of a system for facilitating processing of inter-PLMN messages relating to existing subscriptions. Referring to FIG. 9, the system includes NRF1 100B1 and NRF2 100B2, which may reside in different regions of a PLMN. Each of NRFs 100B1 and 100B2 includes at least one processor 900 and a memory 902. Each of NRFs 100B1 and 100B2 further includes an NF profiles database 904 that stores copies of NF profiles of producer NFs registered with each of NRFs 100B1 and 100B2. It should be noted that the NF profiles in NF profiles databases 904 may be different because NRF1 100B1 and NRF2 100B2 may serve different regions. For example, NF profiles database 904 of NRF 100B1 may contain NF profiles of producer NFs in region X and NF profiles database of NRF2 100B2 may contain NF profiles of producer NFs in region Y. NRFs 100B1 and 100B2 may further include a hint generator/handler 906 for adding hints to subscription identifiers generated for new subscriptions and handling hints for messages relating to existing subscriptions. For example, hint generator/handler 906 may use hints in received subscription update or delete messages to identify the target NRF on which a subscription resides and forward the subscription update or delete messages to the target NRF. Hint generator/handler 906 may be implemented using computer executable instructions stored in memory 902 and executed by processor 900.

In operation, when either of NRFs 100B1 and 100B2 receives a subscription creation request, the receiving NRF may determine whether the NF profile of the producer NF is registered in its NF profiles database 904. If the NF profile is not registered in the NF profiles database, the receiving NRF may forward the subscription creation request to another NRF in a different region. If the NF profile is registered in the NF profiles database of the NRF that receives a subscription request message, after successfully processing the subscription request message and creating the subscription, the hint generator/handler 906 of the receiving NRF may generate a hint indicating that the subscription is located on the NRF, include the hint as all or part of the subscription identifier, add the subscription identifier to the subscription creation response message, and send the subscription creation response message to the subscribing entity.

When either of NRFs 100B1 and 100B1 receives a subsequent message relating to an existing subscription, the receiving NRF may determine whether the subscription is located on the receiving NRF. If the subscription is located on the receiving NRF, the receiving NRF may process the message and generate a response. If the subscription is not located on the receiving NRF, the hint generator/handler 906 may determine whether the subscription identifier includes a hint as to the identity or location of the NRF where the subscription is active. If the subscription identifier includes a hint, the hint generator/handler 906 of the respective NRF may use the hint to identify the NRF where the subscription resides and forward the message to the NRF. If the subscription identifier does not include the hint, the receiving NRF may reject the message relating to the existing subscription or forward the message to another NRF that is configured by a default routing rule of the receiving NRF to receive messages relating to existing subscriptions.

Figure 10:
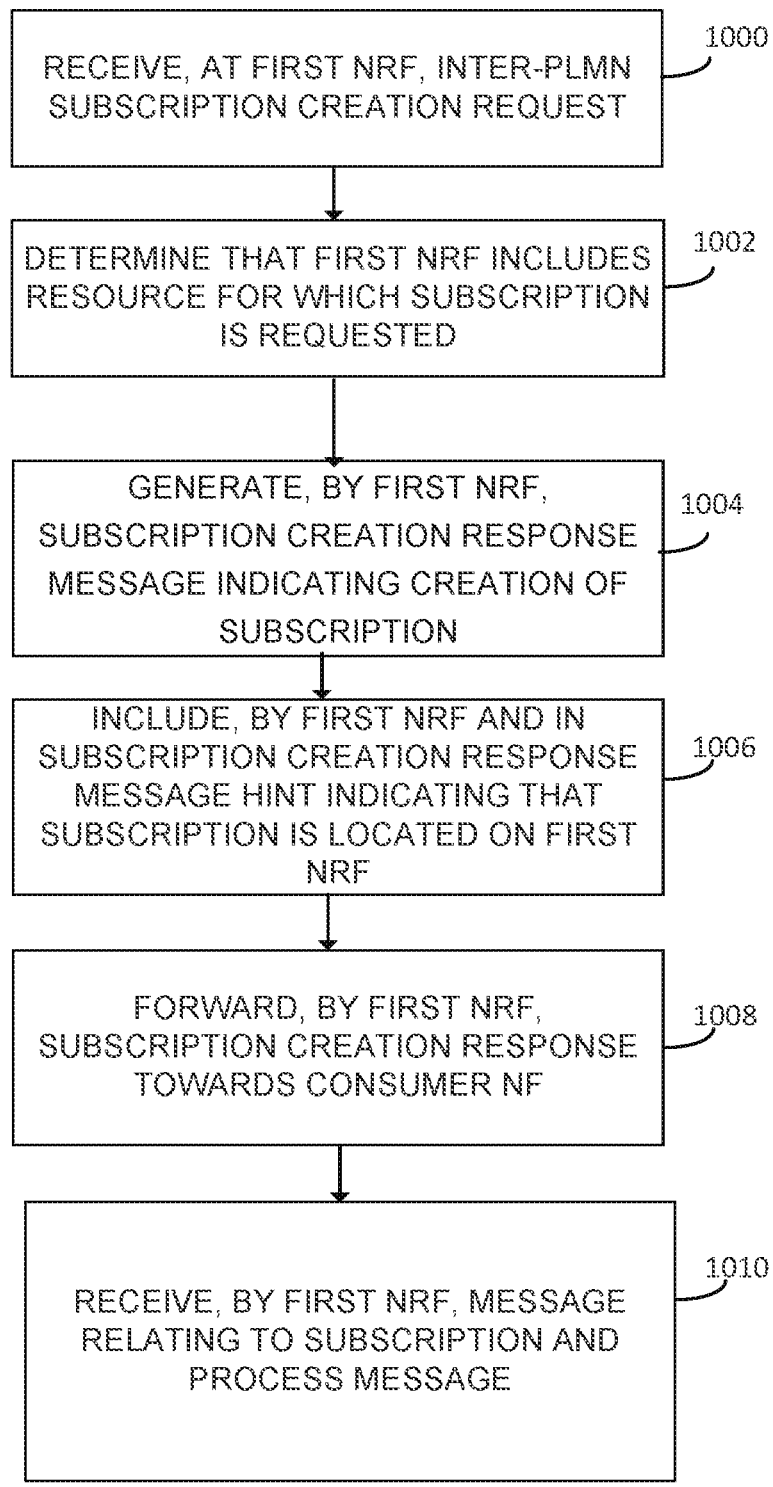
FIG. 10 is a flow chart illustrating an exemplary process for facilitating processing of inter-PLMN messages relating to an existing subscription.

FIG. 10 is a flow chart illustrating exemplary steps for facilitating processing of inter-PLMN messages relating to existing subscriptions. Referring to FIG. 10, in step 1000, the process includes receiving, at a first NRF, an inter-PLMN subscription creation request message for creating a subscription. For example, an NRF such as NRF1 100B1 or NRF2 100B2 serving different regions in a PLMN may receive a message for creating a subscription to receive updates regarding a producer NF. An example of such a subscription creation request message is an NFStatusSubscribe message, as defined in 3GPP TS 29.510.

In step 1002, the process includes determining, by the first NRF, that the first NRF includes a resource for which the subscription is requested. For example, the NRF that receives an NF subscription creation request message, such as an NFStatusSubscribe message, may determine whether the producer NF instance identified in the message is registered with the receiving NRF.

In step 1004, the process includes, in response to determining that the first NRF includes a resource for which the subscription is requested, generating, by the first NRF, a subscription creation response message indicating creation of the subscription. For example, if the receiving NRF determines that the producer NF that is the target of the subscription creation request is registered with the NRF, the NRF may generate a response message indicating successful creation of the subscription. If the request message is an NFStatusSubscribe message, the response message may be a 201 Created message indicating successful creation of the subscription.

In step 1006, the process comprises, including, by the first NRF and in the subscription creation response message, a hint indicating that the subscription is located on the first NRF. For example, the NRF that creates the subscription, may include, as part of the subscription identifier, a hint indicating the location or identity of the NRF where the subscription was created. Including the hint as part of the subscription identifier enables the hint to be passed to the consumer NF, which stores and uses the subscription identifier, including the hint, in subsequent messages relating to the subscription.

In step 1008, the process includes forwarding, by the first NRF, the subscription creation response message towards a consumer NF. For example, the NRF that created the subscription may forward the subscription creation response message to or towards the consumer NF. If the subscription request is an NFStatusSubscribe message, the subscription creation response message may be an 201 Created message with the hint carried in the subscriptionID parameter. For an inter-PLMN NFStatusSubscribe message, the corresponding 201 Created message will be sent to the serving NRF, which appends the mobile country code and mobile network code of the home network to the subscriptionID and forwards the subscription creation response to the consumer NF.

In step 1010, the process includes receiving, by the first NRF, a message relating to the subscription and processing the message. For example, the NRF were a subscription was created may receive, from another NRF that used the hint to identify the NRF or the region of the NRF where the subscription was created, a message for updating or deleting the subscription. The message relating to the subscription may be an NFStatusUnsubscribe message or an HTTP PATCH message to update parameters associated with an existing subscription. The message may include the subscription identifier, including the hint, which allows the receiving NRF that does not host the subscription to identify and forward the message to the NRF that hosts the subscription.

The disclosure of each of the following references is hereby incorporated herein by reference in its entirety.

REFERENCES 1. 3$^{rd}$ Generation Partnership Project; Technical Specification Group Core Network and Terminals; Numbering, addressing, and identification; (Release 17) 3GPP TS 23.003 V17.5.0 (2022-03)
2. 3$^{rd}$ Generation Partnership Project; Technical Specification Group Core Network and Terminals; 5G System; Network Function Repository Services; Stage 3 (Release 17) 3GPP TS 29.510 V17.4.0 (2021-12)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for facilitating processing of inter-public land mobile network (PLMN) messages relating to existing subscriptions, the method comprising:
receiving, at a first network function (NF) repository function (NRF), an inter-PLMN subscription creation request message for creating a subscription, wherein the first NRF serves a first region in a PLMN having a plurality of regions and a second NRF serves a second region of the regions in the PLMN and the first NRF stores NF profiles of producer NFs located in the first region and registered with the NRF and the second NRF stores NF profiles of NFs located in the second region and registered with the second NRF;
determining, by the first NRF, that the first NRF includes a resource for which the subscription is requested, wherein determining that the first NRF includes a resource for which the subscription is requested includes determining that a producer NF instance identified in the subscription creation request message corresponds to one of the producer NFs located in the first region and registered with the first NRF;
in response to determining that the first NRF includes a resource for which the subscription is requested, generating, by the first NRF, a subscription creation response message indicating creation of the subscription;
including, by the first NRF and in the subscription creation response message, a hint indicating that the subscription is located on the first NRF and usable by the second NRF to forward, to the first NRF, subsequent messages related to the subscription that are received by the second NRF; and
forwarding, by the first NRF, the subscription creation response message towards a consumer NF.

2. The method of claim 1 wherein receiving the inter-PLMN subscription creation request message includes receiving a subscription creation request message forwarded by the second NRF that does not host the resource for which the subscription is requested.

3. The method of claim 2 comprising receiving, at the second NRF, a message relating to the subscription and including the hint indicating that the subscription is located on the first NRF, using the hint to determine that the subscription is located on the first NRF; and forwarding the message relating to the subscription to the first NRF.

4. The method of claim 3 wherein receiving the message relating to the subscription includes receiving a message for updating or deleting the subscription.

5. A system for facilitating processing of inter-public land mobile network (PLMN) messages relating to existing subscriptions, the system comprising:
a first network function (NF) repository function (NRF) including at least one processor for receiving an inter-PLMN subscription creation request message for creating a subscription and determining, by the first NRF, that the first NRF includes a resource for which the subscription is requested, wherein the first NRF serves a first region in a PLMN having a plurality of regions and a second NRF serves a second region of the regions in the PLMN and the first NRF stores NF profiles of producer NFs located in the first region and registered with the NRF and the second NRF stores NF profiles of NFs located in the second region and registered with the second NRF; and
a hint generator/handler implemented by the at least one processor for, in response to determining that the first NRF includes a resource for which the subscription is requested, generating, by the first NRF, a subscription creation response message indicating creation of the subscription, wherein determining that the first NRF includes a resource for which the subscription is requested includes determining that a producer NF instance identified in the subscription creation request message corresponds to one of the producer NFs located in the first region and registered with the first NRF, the hint generator/handler for including in the subscription creation response message, a hint indicating that the subscription is located on the first NRF and usable by the second NRF to forward, to the first NRF, subsequent messages related to the subscription that are received by the second NRF, and forwarding, by the first NRF, the subscription creation response message towards a consumer NF.

6. The system of claim 5 comprising the second NRF, wherein the inter-PLMN subscription creation request message includes a subscription creation request message forwarded by the second NRF, which does not host the resource for which the subscription is requested.

7. The system of claim 6 wherein the second NRF is configured to receive a message relating to the subscription and including the hint indicating that the subscription is located on the first NRF, use the hint to determine that the subscription is located on the first NRF; and forward the message relating to the subscription to the first NRF.

8. The system of claim 7 wherein the message relating to the subscription includes a message for updating or deleting the subscription.

9. A non-transitory computer readable medium having stored thereon executable instructions that when executed by a processor of a computer control the computer to perform steps comprising:
receiving, at a first network function (NF) repository function (NRF), an inter-public land mobile network (PLMN) subscription creation request message for creating a subscription, wherein the first NRF serves a first region in a PLMN having a plurality of regions and a second NRF serves a second region of the regions in the PLMN and the first NRF stores NF profiles of producer NFs located in the first region and registered with the NRF and the second NRF stores NF profiles of NFs located in the second region and registered with the second NRF;

determining, by the first NRF, that the first NRF includes a resource for which the subscription is requested, wherein determining that the first NRF includes a resource for which the subscription is requested includes determining that a producer NF instance identified in the subscription creation request message corresponds to one of the producer NFs located in the first region and registered with the first NRF;

in response to determining that the first NRF includes a resource for which the subscription is requested, generating, by the first NRF, a subscription creation response message indicating creation of the subscription;

including, by the first NRF and in the subscription creation response message, a hint indicating that the subscription is located on the first NRF and usable by the second NRF to forward, to the first NRF, subsequent messages related to the subscription that are received by the second NRF; and forwarding, by the first NRF, the subscription creation response message towards a consumer NF.

* * * * *